United States Patent
Kim et al.

(10) Patent No.: US 7,377,805 B2
(45) Date of Patent: May 27, 2008

(54) UNIVERSAL POWER SUPPLY APPARATUS

(75) Inventors: Hyun-Jun Kim, Daejeon (KR);
Dae-Young Youn, Daejeon (KR)

(73) Assignee: Smart Power Solutions Inc. (KR)

( * ) Notice: Subject to any disclaimer, the term of this patent is extended or adjusted under 35 U.S.C. 154(b) by 211 days.

(21) Appl. No.: 10/564,613

(22) PCT Filed: Apr. 20, 2004

(86) PCT No.: PCT/KR2004/000899

§ 371 (c)(1),
(2), (4) Date: Jan. 12, 2006

(87) PCT Pub. No.: WO2005/088820

PCT Pub. Date: Sep. 22, 2005

(65) Prior Publication Data

US 2006/0163948 A1    Jul. 27, 2006

(30) Foreign Application Priority Data

Mar. 18, 2004    (KR) .................. 10-2004-0018602

(51) Int. Cl.
*H01R 11/00* (2006.01)
(52) U.S. Cl. .................. 439/502; 439/638; 307/18
(58) Field of Classification Search ........ 439/500–504, 439/638, 668, 491; 307/18, 25–26, 28–29; 320/2, 111–112; 323/225
See application file for complete search history.

(56) References Cited

U.S. PATENT DOCUMENTS

| | | | |
|---|---|---|---|
| 5,347,211 A | 9/1994 | Jakubowski | 323/351 |
| 5,510,691 A | 4/1996 | Palatov | 320/2 |
| 6,091,611 A | 7/2000 | Lanni | 363/21 |
| 6,604,177 B1 | 8/2003 | Kondo et al. | 711/150 |
| 6,908,334 B2 * | 6/2005 | Huang | 439/491 |

(Continued)

FOREIGN PATENT DOCUMENTS

JP    1990260618    10/1990

(Continued)

OTHER PUBLICATIONS

PCT International Search Report; PCT/KR2004/000899; Dated: Dec. 9, 2004.

(Continued)

*Primary Examiner*—Khiem Nguyen
(74) *Attorney, Agent, or Firm*—Cantor Colburn LLP

(57) ABSTRACT

The present invention relates to an universal power supply apparatus wherein the power suitable for various kinds of portable electronic devices having different shapes and voltages of power input terminals is selectively supplied, and a power supply apparatus wherein a supplied voltage can be changed with only selection of a tip suitable for a portable electronic device. The power supply apparatus of the present invention includes a main unit having an electronic circuit for converting a received voltage, a cable, and a tip having a select pin. According to the present invention, as a desired power supply voltage is automatically adjusted by selecting a proper tip according to a subject electronic device, a manufacture cost is reduced. Further, as the power supply apparatus of the present invention can be used for various kinds of portable electronic devices by exchanging a tip, its operation is very easy.

28 Claims, 2 Drawing Sheets

U.S. PATENT DOCUMENTS 7,081,010 B2 * 7/2006 Gorman ................ 439/535
7,091,421 B2 * 8/2006 Kukita et al. ............ 174/112

FOREIGN PATENT DOCUMENTS

| JP | 3-278208 | 12/1991 |
|---|---|---|
| JP | 5-167425 | 7/1993 |
| JP | 1996-033337 | 2/1996 |
| JP | 1999-262172 | 9/1999 |
| JP | 2002-191133 | 5/2002 |
| JP | 2002262451 | 9/2002 |
| JP | 2003273976 | 9/2003 |
| JP | 2005269881 | 9/2005 |

OTHER PUBLICATIONS

Written Opinion of the International Searching Authority of Corresponding PCT Application: PCT/KR2004/000899; Dated: Dec. 9, 2004.

* cited by examiner (a) OPEN (b) −Junction (c) +Junction

UNIVERSAL POWER SUPPLY APPARATUS

TECHNICAL FIELD

The present invention relates to a universal power supply apparatus that can be used in various portable electronic devices manufactured by different manufacturers and different functions in selecting a tip having a shape suitable for the portable electronic devices.

BACKGROUND ART

Each of portable electronic devices such as a notebook, a PDA, a portable DVD, a camcorder, a digital camera and a mobile phone has a battery therein for a portable use. In order to charge and use the battery, it is required that the DC power having an adequate voltage be supplied through a connector of a proper shape. These portable electronic devices, however, have different voltages depending on not only the type of the device but also the manufacturer. The shape of the input unit for receiving the DC power also varies depending on each device. Accordingly, a user having various kinds of portable electronic devices must carry several power supply apparatuses with him or her, usually called adaptors, and has to purchase several adaptors for respective devices. This will cause the user to suffer greater economic loss.

In an attempt to overcome these problems, a universal power supply apparatus has been proposed. The universal power supply apparatus refers to a power supply apparatus applicable to various kinds of portable electronic devices using one main unit.

In such universal power supply apparatus, a detachable tip, a cable, etc., which are differently applied depending on the shape of an input terminal of a device, has to be first provided. A method for setting a voltage suitable for an electronic device to be used should be then provided.

In a conventional universal power supply apparatus, there is a method for setting a voltage of a device in a main unit using a dip switch, a rotary switch or a resistor having a special shape as disclosed in U.S. Pat. No. 5,347,211 and for providing a tip or cable detachable from the main unit and mated with the shape of the input terminal of an electronic device to be used. According to this method, however, a user has to perform two steps of finding the tip or cable that can be used in a portable electronic device and setting a proper voltage in the main unit. Accordingly, this method has a disadvantage that a user who is short of common sense on the electronic device has a difficulty in using the device.

In order to overcome this problem, U.S. Pat. Nos. 5,510,691, 6,604,177, 6,091,611 and so on disclose a method for providing a special unit for changing a voltage in the tip or cable. The special unit includes inevitably at least one electronic element such as a resistor, a condenser and a diode. This unit is usually called an attached circuit. In case where an electronic element is disposed in the cable, however, an expensive cable has to be used as the electronic device changes. Further, if the special unit is installed in the tip, between-the-main circuit and the attached circuit has to be connected by means of a long cable. Accordingly, the method for providing the special unit has disadvantages that its manufacture and test methods are difficult and stability of a voltage is also low.

DISCLOSURE OF INVENTION

Accordingly, the present invention has been made in view of the above problems, and it is an object of the present invention to provide a universal power supply apparatus that can be applied to various portable electronic devices manufactured by different manufacturers and having different voltages using one unit through only selection of a suitable tip, by means of a tip 400 having a select pin 420 for selecting a voltage suitable for a portable electronic device and a select information display unit 440 for displaying a set state of the tip to a user.

According to the present invention, the tip 400 includes the select pin 420 for informing a main unit of a voltage that is internally required through only connection state information (a short circuit, connection to a (−), connection to a (+)), and the select information display unit 440 for helping a user to select a tip suitable for an electronic device to be used.

Further, the main unit 100 further includes an output select unit 200 for receiving and allowing a desired voltage to be selected using connection information of the select pin included in the tip, in a switching mode power supply (SMPS) circuit of a PWM (Pulse Width Modulation) mode used in a common power supply apparatus.

Therefore, the universal power supply apparatus having the main unit 100, which consists of the tip 400 in which the select pin 420 is included and the output select unit 200, has advantages that a tip is miniaturized, manufacture and test methods are simple and the price is low compared to a conventional power supply apparatus having a circuit into which additional components separated from a main unit are inserted.

The power supply apparatus of the present invention can be used as a universal DC/DC adaptor that can be used in portable electronic devices having different shapes of input terminals by selecting a proper tip 400 using one main unit if the DC power such as a vehicle and an aircraft is used as an input, can be used as a universal AC/DC adaptor if the AC power is used as the input, and can be used as a universal external type battery pack if the DC power outputted from a battery mounted therein is used as the input.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

Figure 1:
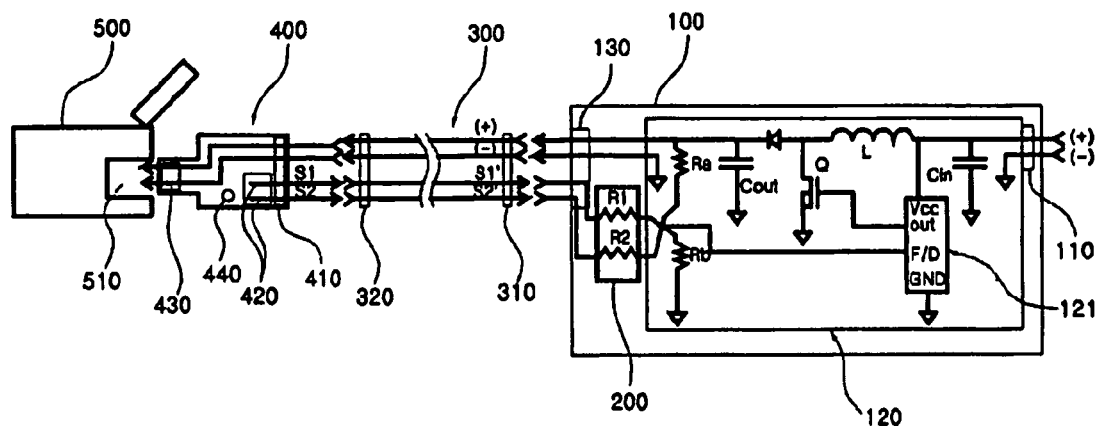
FIG. 1 shows a boost type DC/DC converter using two select pins according to an embodiment of the present invention.

A universal power supply apparatus of the present invention includes a tip 400 having a select pin 420 for selecting a voltage and a select information display unit 440 for helping a user to select a proper tip, a main unit 100 having an output select unit 200 for selecting and outputting a necessary voltage through only connection information of a select pin in the tip, and a cable 300 for connecting the tip and the main unit.

The select pin 420 has one side to/from which the cable connected to the main unit is attachable/detachable and the other side formed according to the shape of a DC input terminal of a portable electronic device, and stores information on a voltage needed by the portable electronic device. Further, the select information display unit 440 displays information on the selected tip.

The tip of the present invention is designed so that the output select unit of the main unit can select a desired voltage through only a short circuit, connection to the (−) pin and connection to the (+) pin of the select pin 420 connected to the main unit, unlike a conventional method for inserting electronic elements such as a resistor, a diode and a condensor.

The main unit 100 further includes the output select unit 200 for sensing information on three kinds of connection states [the short circuit, connection to the (−) pin and connection to the (+) pin ] of the select pin included in the tip of the present invention and then providing a proper voltage in a SMPS type power supply converter, which is controlled in a common PWM mode such as a boost type, a buck type and a fly-back type.

The output select unit 200 includes a resistor array having one or more resistors that can change a divided value of a reference voltage using a feedback stage of a PWM control IC. The output select unit 200 is located within the main unit 100.

The cable unit 300 includes signal lines for connecting the tip and the main unit. The signal line serve to provide the state of the select pin included in the tip to the output select unit of the main unit, in addition to (+) and (−) lines seen in a common cable.

The cable 300 has one side connected to the main unit, which can be fixed or detached according to applications, and the order side connected to the tip, which consists of a connector that can be attached/detached to/from the tip.

The universal power supply apparatus constructed above can be used as the universal DC/DC adaptor if a cable suitable for the DC power provided in a vehicle, an aircraft, etc. is formed in the input terminal 110 of the main unit and the universal power supply apparatus is designed as a boost type or buck type PWM circuit, can be used as the universal AC/DC adaptor if an AC connector for receiving the AC power as the input formed and the universal power supply apparatus is designed as a fly-back circuit, and can be used as the universal external type battery pack applicable to portable electronic devices if a battery and a circuit for controlling the battery are formed and the universal power supply apparatus is designed as the voltage boost type or buck type PWM circuit for receiving the battery DC power as the input.

In the universal power supply apparatus of the present invention, electronic elements such as resistors, diodes and condensers are collectively formed at one place of the main unit. Thus, there are advantages that a manufacturer can provide a small size tip compared to the conventional universal power supply apparatus having the attached circuit, simplify a manufacture process and reduce the price of a product. Further, there is an advantage that a user can secure the power supply apparatus, which is applicable to variety of products having different voltages through only simple work to replace a tip.

The present invention will now be described in detail in connection with preferred embodiments with reference to the accompanying drawings.

FIG. 1 shows a boost type DC/DC converter using two select pins 420 according to an embodiment of the present invention. The number of the select pins 420 refers to the number of pins for selecting a voltage except for (+) and (−) lines. If the number of the select pins 420 is two, a total number of the pins disposed within the tip 400 is 4. As two pins for connection to the (+) line and the (−) lines are included, however, the number of the pins that actually serve as the select pin is two.

The main unit 100 shown in FIG. 1 further includes the output select unit 200 for interpreting information on the connection state of the select pin 420 included in the tip and then producing different outputs in a SMPS (switching mode power supply) circuit using a common PWM (Pulse Width Modulation) mode. To this end, the main unit 100 includes a power input terminal 110 for receiving the DC power being the construction of the SMPS circuit using PWM, a voltage converter 120 consisting of a common SMPS circuit having a PWM control IC 121 for comparing a reference voltage and a current state and producing an output that changes a pulse width to the gate terminal of a FET Q, and the output select unit 200 having a circuit for changing the reference voltage inputted to the feedback terminal of the PWM control IC using information according to the connection location of the select pin 420 included in the tip 400, in the circuit having the power output terminal 130.

The power input terminal 110 serves to apply the DC power outputted from the power supply. At this time, the DC power includes all DC power used in a vehicle, an aircraft and a battery. Therefore, the shape of the input terminal connected to the input terminal of the present invention may include the shape of a cable used in a vehicle cigarette jack, an air jack, etc., an AC power terminal for home and the DC power terminal such as a battery, and a PCB pattern having the DC power obtained by an additional circuit, though it is not a direct DC power. As such, the present invention can be applied to the power of various shapes.

The voltage converter 120 is the common SMPS circuit including a PWM control IC 121, which has the feedback terminal and the output terminal for comparing the reference voltage and a current state and then producing an output that changes the pulse width to the gate terminal of the FET Q. The voltage converter 120 may be a boost type, a buck type or a fly-back type circuit. The PWM control IC according to the present circuit may include various kinds of PWM control ICs such as Max668, TL494, UCC3843 and UCC38H43.

The voltage converter 120 necessarily includes the PWM control IC 121 being one of components of the SMPS circuit, the FET Q being a switching device, a diode D, an inductor or a transformer L, and condensers Cin and Cout for smoothing the voltages at the input and output terminal. However, the voltage converter 120 may be a boost type, pressure sensitive type or fly-back type circuit depending on the type of the input used and a state of a voltage to be outputted. Furthermore, the voltage converter 120 includes circuits for securing stability such as blocking of overvoltage and overcurrent, and separation of the input and output as basic circuits. The voltage converter 120 may further include a circuit for removing an electronic wave, a circuit for displaying the operating state, and so one.

The output select unit 200 includes resistor arrays R1 to Rn for providing a divided value of the reference voltage to the feedback terminal of the PWM control IC 121 according to states of select stages S1 to Sn included in the select pin 420 of the tip 400. The type of the voltage to be outputted is decided depending on the number of the select pin 420 used and the number of the resistor arrays included in the output select unit 200. For example, if one select pin 420 is used, there are three states such as a short circuit, connection to the (+) pole and connection to the (−) pole. Three different outputs can be obtained by disposing one resistor corresponding to the select pin 420. Accordingly, by constructing the output select unit 200 using the resistor arrays having the N number of the select pin 420 and the N number of the resistors, the 3N number of different voltages can be selected. At this time, if the number of the voltage required is below 3N, the 2N number of different voltages can be selected by using the select pin as two states such as the short circuit and connection to the (−) pole.

The power output terminal 130 of the main unit further includes the select stages S1 to Sn that can be connected as many as the number of the select pin 420 of the tip, in addition to the (+) and (−) terminals.

The cable unit 300 serves to connect the main unit 100 and the tip 400. The cable unit 300 includes a cable input terminal 310 connected to the main unit 100, a cable output terminal 320 connected to the tip 400, an inner cable connected to the I/O terminals, and an outer cover surrounding an inner cable. The cable input terminal 310 is connected to the output terminal of the main unit 100.

In the present invention, connection to the input unit may be integrated as a single body by adding the main unit thereto depending on the type of a product to be applied, or can be separated using a connector.

The cable output terminal 320 is connected to the tip 400 and has a structure attachable/detachable to/from the tip. The inner cable has the (+) and (−) lines along which electricity can flow, and a select line for obtaining the state of the select pin 410. In the above, it is effective that the (+) and (−) lines use 16 to 22 AWG lines depending on the amount of current and the select lines S1 to Sn use 24 to 28 AWG lines in order to reduce a thickness of the cable.

The external appearance of the cable has a shield as a conductor therein and is made from a material such as PVC, but is not limited thereto.

The tip 400 includes a tip input terminal 410 connected to the output terminal of the cable, a select pin 420, a tip output terminal 430 connected to a DC input terminal of a portable electronic device, and a select information display unit 440. The tip input terminal 410 includes two (+) and (−) power pins, and the select pins 420 whose number is decided depending on the number of a voltage to be set. The tip input terminal 410 has a shape of a connector that is easily attached/detached to/from the output terminal 320 of the cable.

Each of the select pins 420 has three states such as a shot circuit to which nothing is connected, connection to the (+) pole, and connection to the (−) pole. Therefore, for the N number of a select pin, a tip having the 3N number of states can be manufactured.

The tip output terminal 430 is fabricated to have the shape and polarity that are suitable for the power input terminal 510 of the portable electronic device 500.

The select information display unit 440 functions to inform a user of a state set in a tip and includes numerical information to indicate numbers on the outside of the tip, color information that is displayed at the end or body of the tip, and a use manual provided additionally. The numerical information indicates a number or symbol depending on a shape and reference voltage of the tip output terminal 430. The color information indicates color depending on a voltage set in a tip. Such a select information display unit 440 can be fabricated by forming a tip having a proper voltage and a shape of a connector in a portable electronic device, displaying numerical information and color information on the outside of the tip, and then presenting a model name and user method of the portable electronic device to the user manual.

The user can find a tip 400 available to his or her portable electronic device from the user manual and then connect it to the cable output terminal 320. Accordingly, a user that has no idea on electronic common sense can use easily the portable electronic device.

However, it is impossible to represent the entire portable devices that can be used with only such numerical information on the user manual. Therefore, helping a user who has a portable electronic device that is not represented in the user manual to select a tip suitable for him or her, is color information. A user having a portable electronic device not represented in the user manual will first find a tip physically suitable for a DC input terminal of the electronic device and, if a found tip is used, then determines whether a voltage is suitable for the electronic device based on color information. The color information may include yellow, red, black, and so on.

Figure 2:
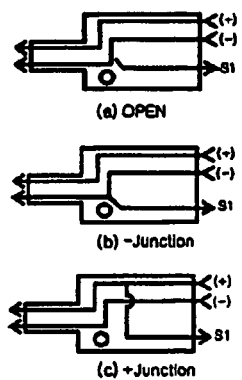
FIG. 2 shows three kinds of states represented by a tip when one select pin is used.

FIG. 2 shows three states that can be represented by a tip when one select pin 420 is used. FIG. 2(a) shows a short circuit state, FIG. 2(b) shows a (−) pole junction, and FIG. 2(c) shows a (+) pole junction. As described above, the select pin serves to change the voltage. Two pins connected to the (+) pole and (−) pole are usually separately provided within the tip.

The output voltage depending on the use of the select pin as shown in FIG. 2 will be described. In the circuit using the PWM control IC 121, when a reference voltage of an error amplifier included in the feedback terminal of the PWM control IC is Vref, an output voltage Vout is defined as Vref*(Ra+Rb)/Rb. Accordingly, the three states that are represented when one select pin (S1 of 420) and a resistor R1 of the output select unit 200 are used can be expressed into Equation 1 in case of the short circuit, Equation 2 in case of the (−) pole junction, and Equation 32 in case of the (+) pole junction.

$$Vout[\text{short circuit}]=Vref(1+Ra/Rb) \qquad 1)$$

$$Vout[(-)\text{ pole junction}]=Vref[1+Ra*(Rb*R1/(Rb+R1))] \qquad 2)$$

$$Vout[(+)\text{ pole junction}]=Vref[1+(Ra*R1/(Ra+R1))/Rb] \qquad 3)$$

According to an embodiment of the present invention, a case where the universal power supply apparatus for supplying the power to the notebook computer to be constructed will be described in more detail.

A typical notebook computer usually has built 6 to 12 lithium ion batteries in, uses a voltage of 18 to 20 volts or a voltage of 15 to 16 volts, and has the power of 60 to 90 Watts. A portable DVD has 4 to 8 lithium ion batteries and a voltage of 12 to 13 volts. As an embodiment of the present invention to be applied to it, a 72-watts universal power supply apparatus having one select pin (S1 of 420) and the resistor R1 of the output select unit is fabricated. The universal power supply apparatus can be applied to a notebook computer and a portable DVD player over 80%. To this end, in Max668 whose reference voltage is 1.25 volts, Ra is 45K ohms, Rb is 3.8K ohms and R1 is 150K ohms, a voltage of 15 to 16 volts is obtained in the short circuit state, a voltage of 18 to 20 volts is obtained in the (−) junction state, and a voltage of 12 to 13 volts is obtain in the (+) junction state. Similarly, in UCC38H43 whose reference voltage is 2.5 volts, it is possible to obtain the same result as the above if Ra, Rb and R1 are set to 20 Kohms, 3.8 Kohms and 62 Kohms, respectively.

In the above, the resistance values are not limited to the above values but can be variously changed in deciding resistance and the amount of output watt that satisfy Equation 1 to Equation 3. It is thus possible to obtain the universal power supply apparatus that can be applied to a variety of products.

In using the universal power supply apparatus fabricated as above, a user can change a first voltage suitable for a first device to a second voltage suitable to a second device by simply inserting the tip 400 fabricated according to the reference.

As another application embodiment, in case of a PDA, a mobile phone, a camcorder, a digital camera and a portable DVD player, which use 1 to 6 lithium ion batteries, it is effective to fabricate an universal power supply apparatus that has the power of below 5 to 24 watts and can select 2 to 6 voltages using 2 or less select pins. Therefore, a 18-watts universal power supply apparatus, which has a PWM control IC whose reference voltage is 1.25 volts, Ra of 21 Kohms, Rb of 3.4 Kohms and R1 of 20 Kohms, and one select pin whose first voltage condition [(+)pole junction] is 4 to 5 volts, second voltage condition [short circuit] is 9 to 10 volts, and third voltage condition [(−)pole junction] is 12 to 15 volts, is fabricated. The 18 watts universal power supply apparatus can be then applied to a PDA, a mobile phone, a camcorder and a digital camera over 80%.

As described above, in the universal power supply apparatus according to the present invention, the amount of an output voltage and a voltage selection condition are not limited to a narrow range but can be changed unlimitedly depending on the type of an electronic device used. For instance, if resistors corresponding to the N number of select pins S1 to Sn are composed of the N number of resistor arrays R1 to Rn, the 3N number of different voltages can be obtained using a tip having the 3N number of states.

Figure 3:
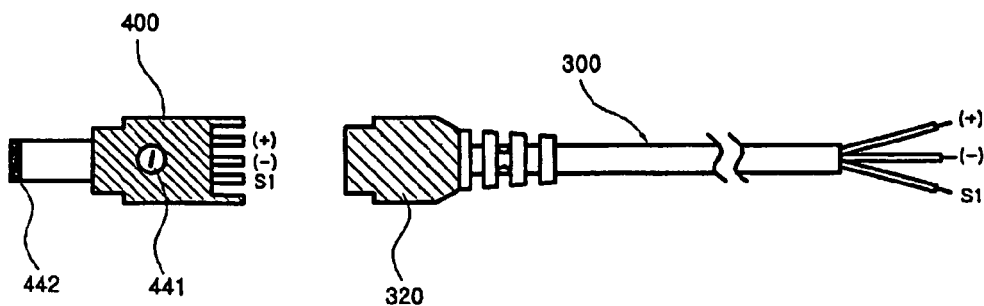
FIG. 3 shows an external appearance of a tip having one select pin and a cable according to the present invention.

FIG. 3 shows an external appearance of the tip 400 having one select pin 420 and the cable 300 according to an embodiment of the present invention. (+) and (−) connection units and the pin (S1 of 420) substantially serving as the select pin are formed in the tip 400. Further, the select information display unit 440 is formed in its external appearance. The select information display unit is divided into a numerical information display unit 441 and a color information display unit 442. The numerical information display unit 441 is represented on the body of the tip and is fabricated to have 20 or more different numbers depending on the shape and voltage suitable for a DC input terminal of an electronic device. The color information display unit 442 is represented at the end of a tip if it has an insulator at the end of the tip, and is represented at the body of the tip otherwise.

Figure 4:
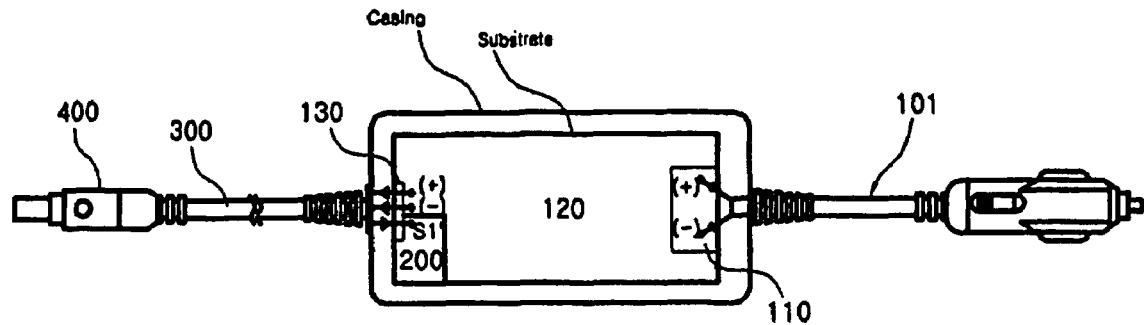
FIG. 4 shows a universal DC/DC adaptor fabricated according to the present invention.
Figure 5:
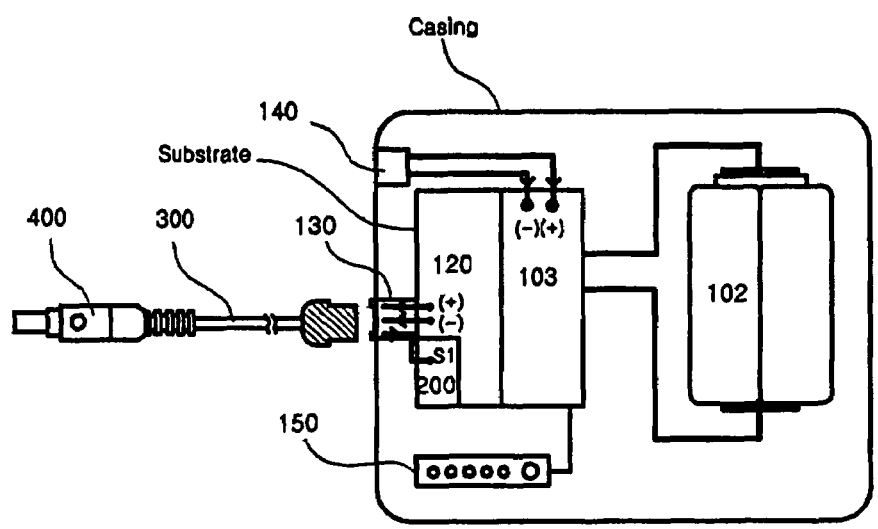
FIG. 5 shows a universal external type battery pack fabricated according to the present invention.
Figure 6:
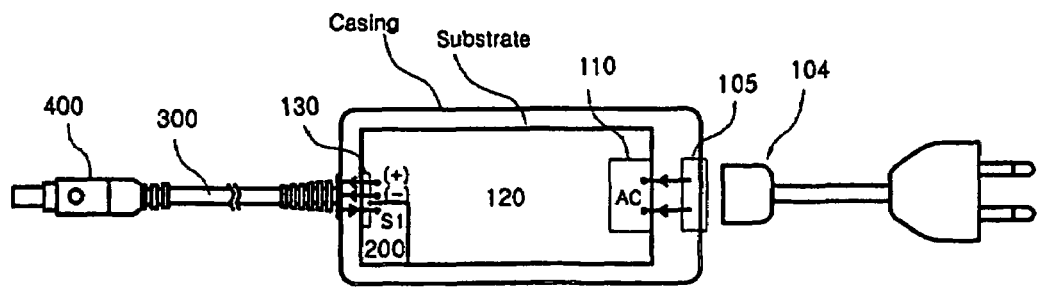
FIG. 6 shows a universal AC/DC adaptor fabricated according to the present invention.

FIG. 4 to FIG. 6 show universal power supply apparatuses that are fabricated in various manners according to the type of an external power according to the present invention.

FIG. 4 shows the universal DC/DC adaptor in which the main unit 100 is used as a substrate, an external power cable 101 for receiving the DC power from a vehicle's cigarette jack is connected to a power input terminal 110 included in the substrate, a cable unit 300 is connected to a power output terminal 130 of a main unit, and a plastic casing is used as an external appearance. The input power cable 101 may include a cable for a vehicle, a cable for an airplane located at the airplane's seat, a cable from a specific DC power source and the like.

FIG. 5 shows the universal external type battery pack in which a battery 102 and a circuit unit 103 for controlling the battery are connected to at the front of the input terminal of the main unit 100, a connector mated with the input terminal of the cable unit 300 is located at the output terminal 130, and a casing is finished. The battery pack provides a voltage suitable for an input voltage range allowed by a portable electronic device and can thus be effectively used in wide places than the battery pack having no such function. The battery 102 may include a primary cell such as alkaline, a secondary cell such as a Li-ion battery, a NiMH battery and a lead-acid battery, a fuel cell such as a DMFC (Direct Methanol Fuel Cell) and PEM FC (Proton Exchange Membrane Fuel Cell) and so on.

The battery control circuit 103 includes a protection circuit for protecting the battery, a charge circuit for charging the battery, and a user interface circuit for informing a user of the available capacity of the battery, etc. Furthermore, the external type battery pack includes a terminal 140 for charging, a LED for displaying the capacity of the battery, and a user interface unit 150 having a switch.

FIG. 6 shows the universal AC/DC adaptor in which a power input terminal 110 has a connector 105 that can be connected by an AC cable 104, a voltage converter 120 receives AC current to form a fly-back type SMPS, a cable 300 is connected thereto, and a casing is finished. The universal AC/DC adaptor is an adaptor that can be used in various kinds of portable electronic devices like the universal DC/DC adaptor and the universal external type battery. The fly-back type SMPS used in this embodiment is the same as the boost type DC/DC convert circuit presented in FIG. 1 in that it has an output converter 200 and analyzes the output terminal S1 of the tip to produce different outputs to the tip, but is different from the boost type DC/DC convert circuit presented in FIG. 1 in that it uses a transformer instead of an inductor and includes an optocoupler for receiving a feedback signal.

INDUSTRIAL APPLICABILITY

In a universal power supply apparatus according to the present invention, a desired power supply voltage is automatically adjusted by selecting a proper tip according to a subject electronic device. Accordingly, a manufacturer can reduce a manufacture cost since circuits are commonly manufactured, a seller can conveniently sell tips since the tips are easily discriminated, and a user can easily use various kinds of portable electronic devices by exchanging the tips.

Furthermore, if an input constituting the present invention is disposed in a cable mated with the DC power outputted from a vehicle, an aircraft, etc. and is finished with a casing, a universal DC/DC adaptor is provided. If the input is used as the AC power, a universal AC/DC adaptor is provided. If a battery is installed therein, a universal external type battery pack is provided.

In the universal power supply apparatus according to the present invention, as pins are connected to tips without inserting an electronic device, various voltages can be selected. As the electronic device is concentrated to one place of a main unit, there are advantages that a manufacture process can be simplified, the tip can be miniaturized and a manufacture cost can be reduced, compared to a conventional universal power supply apparatus having an attached circuit.

What is claimed is:

1. An universal power supply apparatus, comprising:
    a tip that is attachable and detachable, wherein the tip comprises a select pin for selecting a voltage, a tip input terminal and a tip output terminal;
    a main unit having a voltage converter, an input terminal, an output terminal, and an output select unit for converting a divided value of a reference voltage according to a state of a select stage included in the select pin of the tip; and
    a cable for connecting the tip and the main unit.

2. The universal power supply apparatus as claimed in claim 1, wherein the tip is exchanged according to a desired select voltage.

3. The universal power supply apparatus as claimed in claim 1, wherein the tip further comprises a select information display unit for displaying selection of a tip.

4. The universal power supply apparatus as claimed in claim 3, wherein the select information display unit comprises a numerical information display unit for displaying an adequate shape and voltage to a DC input terminal of an electronic device, and a color information display unit for displaying color.

5. The universal power supply apparatus as claimed in claim 1, wherein a first voltage selected by the change of the select pin is 15 to 16 volts, a second voltage is 18 to 20 volts, and a use power is 60 to 90 watts.

6. The universal power supply apparatus as claimed in claim 1, wherein a first voltage condition selected by the change of the select pin is 4 to 5 volts, a second voltage condition is 9 to 10 volts, a third voltage condition is 12 to 15 volts, and a use power is 5 to 24 watts.

7. The universal power supply apparatus as claimed in claim 1, wherein the universal power supply apparatus operates as a DC/DC adaptor using the DC power as an input power to the main unit.

8. The universal power supply apparatus as claimed in claimed 1, wherein the universal power supply apparatus operates as an external type battery pack in which a battery and a battery control circuit are connected to the input terminal of the main unit.

9. The universal power supply apparatus as claimed in claim 1, wherein the universal power supply apparatus operates as an AC/DC adaptor using the AC power as an input power to the main unit.

10. The universal power supply apparatus as claimed in claim 1, wherein the voltage converter comprises a PWM control IC being one of components of a SMPS circuit, a FET being a switching device, a diode, an inductor or a transformer, and condensers for smoothing voltages at unput and output sides.

11. The universal power supply apparatus as claimed in claim 2, wherein a first voltage selected by the change of the select pin is 15 to 16 volts, a second voltage is 18 to 20 volts, and a use power is 60 to 90 watts.

12. The universal power supply apparatus as claimed in claim 3, wherein a first voltage selected by the change of the select pin is 15 to 16 volts, a second voltage is 18 to 20 volts, and a use power is 60 to 90 watts.

13. The universal power supply apparatus as claimed in claim 4, wherein a first voltage selected by the change of the select pin is 15 to 16 volts, a second voltage is 18 to 20 volts, and a use power is 60 to 90 watts.

14. The universal power supply apparatus as claimed in claim 2, wherein a first voltage condition selected by the change of the select pin is 4 to 5 volts, a second voltage condition is 9 to 10 volts, a third voltage condition is 12 to 15 volts, and a use power is 5 to 24 watts.

15. The universal power supply apparatus as claimed in claim 3, wherein a first voltage condition selected by the change of the select pin is 4 to 5 volts, a second voltage condition is 9 to 10 volts, a third voltage condition is 12 to 15 volts, and a use power is 5 to 24 watts.

16. The universal power supply apparatus as claimed in claim 4, wherein a first voltage condition selected by the change of the select pin is 4 to 5 volts, a second voltage condition is 9 to 10 volts, a third voltage condition is 12 to 15 volts, and a use power is 5 to 24 watts.

17. The universal power supply apparatus as claimed in claim 2, wherein the universal power supply apparatus operates as a DC/DC adaptor using the DC power as an input power to the main unit.

18. The universal power supply apparatus as claimed in claim 3, wherein the universal power supply apparatus operates as a DC/DC adaptor using the DC power as an input power to the main unit.

19. The universal power supply apparatus as claimed in claim 4, wherein the universal power supply apparatus operates as a DC/DC adaptor using the DC power as an input power to the main unit.

20. The universal power supply apparatus as claimed in claim 2, wherein the universal power supply apparatus operates as an external type battery pack in which a battery and a battery control circuit are connected to the input terminal of the main unit.

21. The universal power supply apparatus as claimed in claim 3, wherein the universal power supply apparatus operates as an external type battery pack in which a battery and a battery control circuit are connected to the input terminal of the main unit.

22. The universal power supply apparatus as claimed in claim 4, wherein the universal power supply apparatus operates as an external type battery pack in which a battery and a battery control circuit are connected to the input terminal of the main unit.

23. The universal power supply apparatus as claimed in claim 2, wherein the universal power supply apparatus operates as an AC/DC adaptor using the AC power as an input power to the main unit.

24. The universal power supply apparatus as claimed in claim 3, wherein the universal power supply apparatus operates as an AC/DC adaptor using the AC power as an input power to the main unit.

25. The universal power supply apparatus as claimed in claim 4, wherein the universal power supply apparatus operates as an AC/DC adaptor using the AC power as an input power to the main unit.

26. The universal power supply apparatus as claimed in claim 2, wherein the voltage converter comprises a PWM control IC being one of components of a SMPS circuit, a FET being a switching device, a diode, an inductor or a transformer, and condensers for smoothing voltages at input and output sides.

27. The universal power supply apparatus as claimed in claim 3, wherein the voltage converter comprises a PWM control IC being one of components of a SMPS circuit, a FET being a switching device, a diode, an inductor or a transformer, and condensers for smoothing voltages at input and output sides.

28. The universal power supply apparatus as claimed in claim 4, wherein the voltage converter comprises a PWM control IC being one of components of a SMPS circuit, a FET being a switching device, a diode, an inductor or a transformer, and condensers for smoothing voltages at input and output sides.

* * * * *